Patented Dec. 14, 1926.

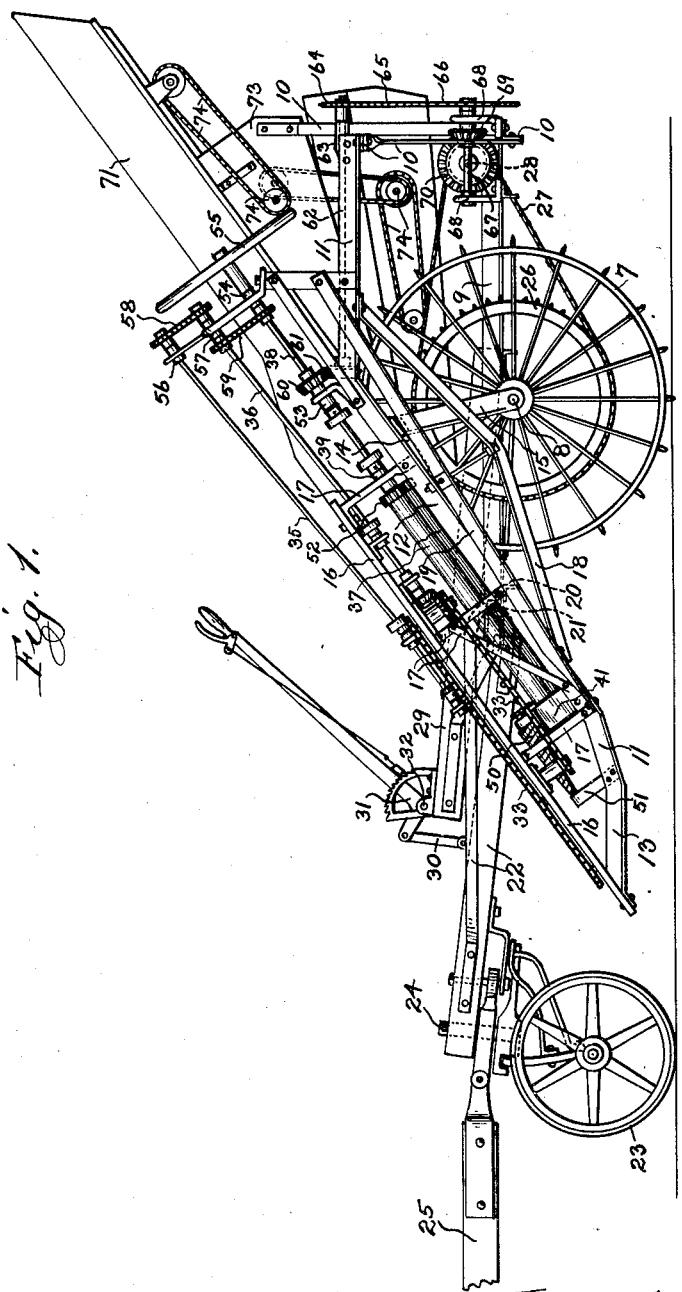

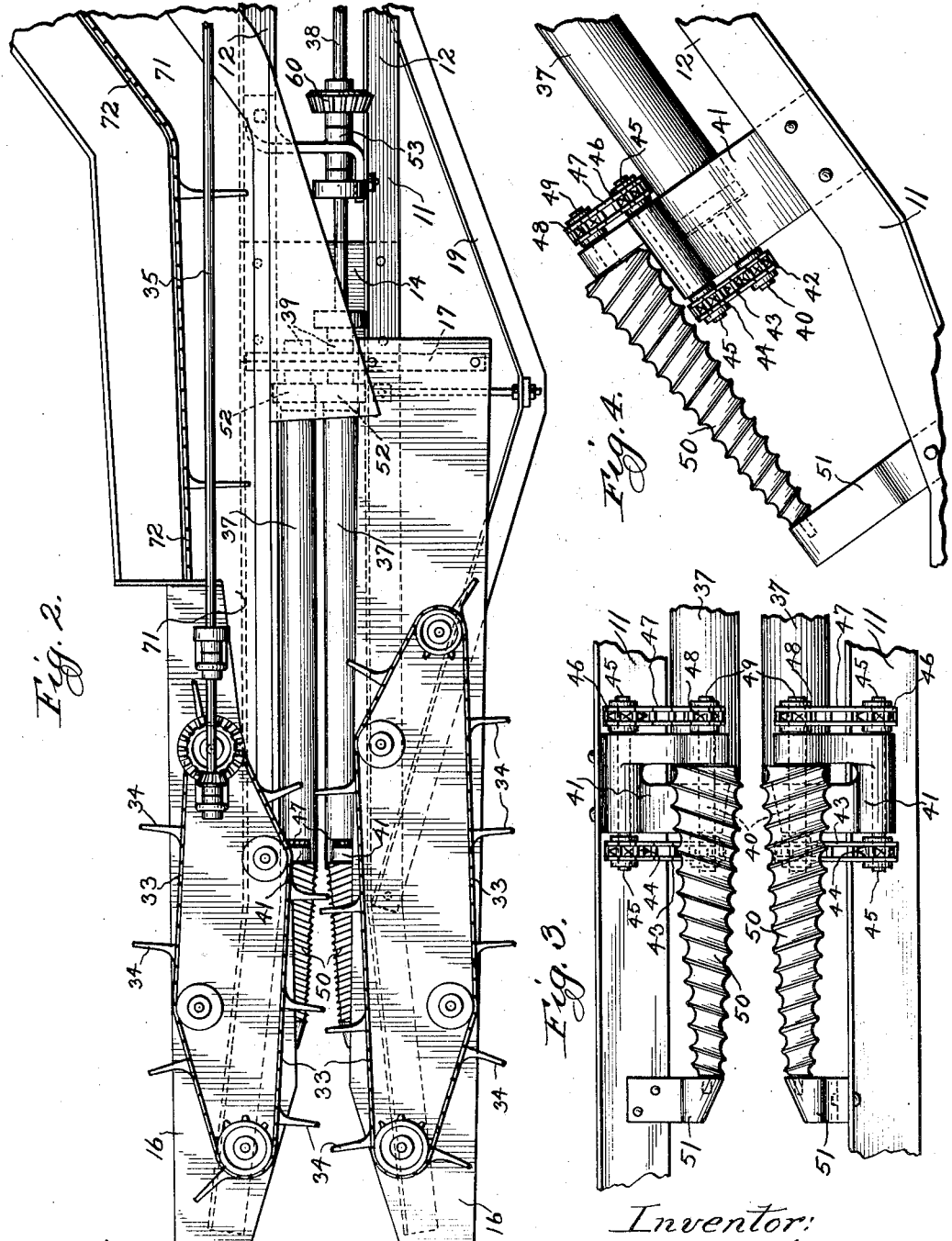

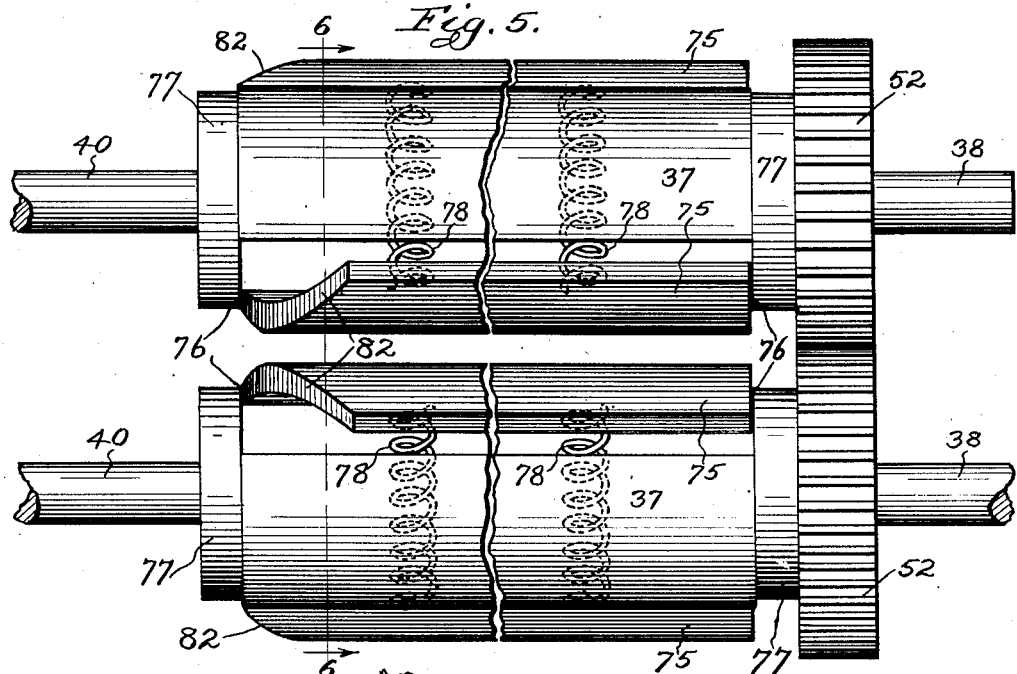
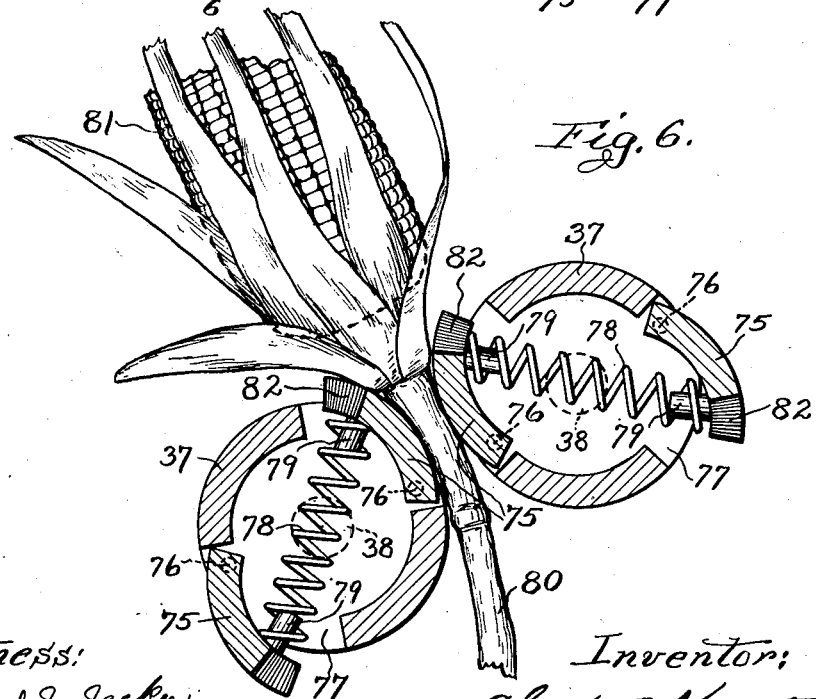

1,610,611

UNITED STATES PATENT OFFICE.

CHESTER KNUTSON, OF WATERMAN, ILLINOIS.

CORN-HARVESTING MACHINERY.

Application filed April 28, 1924, Serial No. 709,441. Renewed November 10, 1926.

My invention relates to corn picking and husking machines designed to remove the ears of corn from the stalks while standing in the field, and the objects of my improvements are first, to so construct the picking rolls that each ear will be pressed or snapped away from its stalk and free from its husk; second, to provide a pair of gathering rolls at the front end of the picking rolls; third, to so construct and arrange the different rolls that the ears will all be picked off and removed from the husks; and fourth, to make a simple, durable and efficient construction having other advantageous features to become apparent from the description to follow.

In the operation of corn picking and husking machines it is desirable to pick off all the ears and remove all the husks, to have only a single row of stalks passing through the picking rolls at a time, and to have the mechanism simple in construction to avoid getting out of order and clogging. All these desirable features are attained by the use of my invention.

To describe my invention so that others versed in the art to which it pertains can make and use the same I have illustrated it on the accompanying three sheets of drawings forming a part of this specification and in which—

Figure 1 is a side elevation of a corn picking and husking machine embodying my invention;

Fig. 2 is a fragmentary plan view with parts omitted for purposes of illustration showing the picking rolls and parts immediately associated therewith;

Fig. 3 is a detail plan view showing the gathering rolls on an enlarged scale;

Fig. 4 is a side elevation of the parts shown in Fig. 3;

Fig. 5 is a plan view of the picking and husking rolls detached, enlarged; and

Fig. 6 is a sectional view taken on the line 6—6 of Fig. 5.

Similar reference characters refer to similar parts throughout the several views.

While my improved picking and husking rolls are designed to pick and husk the ears of corn, I have nevertheless shown my invention in connection with a machine that is known to the trade as a Deering corn picker which has a husking compartment. I will therefore not describe its husking compartment.

The machine is provided with two traction wheels 7 equal in size loosely mounted on the fixed axle 8, rigidly secured to the horizontally disposed angles 9 of the frame. The frame also comprises rear end braces 10 disposed in vertical planes which serve to fasten the lower horizontal angles 9 to the upper horizontal angles 11 which as shown at 12 are inclined downwardly in front of the axle 8 to a point near the ground where their extremities 13 again extend horizontally. These angles 11 as seen in Fig. 2, extend parallel and spaced apart for the greater part of their length and at a point about midway their length are rigidly secured together by the plate 14 which in turn is supported and held in position by the brace 15 extending up from the end of the axle 8 to which it is rigidly secured.

Suitable gathering boards 16 are provided above and parallel to the inclined portion 12 of the frame and are secured thereto by a number of braces 17 and to the forward extremities 13 of the angles 11 themselves. The gathering boards 16 are beveled at their front ends as usual better to gather the stalks of corn therebetween when the machine moves forward. Suitable strut braces 19 and 18 are provided to stiffen the forward end of the angle 11. The lower horizontally disposed angles 9 forward of the axle 8 are tied together by an angle iron 20 to which is pivotally connected at 21 the forward truck frame 22 which has its front end supported on the castor wheels 23, which are mounted to swivel about the pin 24 as a pivot. The draft tongue 25 is also connected to the frame 22 through the medium of pin 24. Obviously when the machine is moved forward the traction wheel 7 will rotate counterclockwise as viewed in Fig. 1, and the operating power for the mechanism is obtained by means of a large sprocket wheel 26 rigidly secured to the traction wheel 7, and connected by sprocket chain 27 to a small sprocket wheel rigidly mounted on the shaft 28 mounted in suitable bearings provided on the rear part of the frame.

To provide for adjustment of the front end of the frame carrying the gathering boards 16 to a higher or lower position above the ground, the frame is provided with a forwardly extending beam 29 above the truck frame 22, at the front end of which a link 30 connects the frame 22 to the free end of the short arm of a bell crank lever 31 pivoted at 32 to the beam 29. The long arm of the bell crank lever 31 is made in the shape of a handle provided with the customary holding catch, so that as the handle is moved to the right as viewed in Fig. 1, the front end of the frame will be lowered and as the handle is moved to the left the front end of the frame of the machine will be raised. The position shown in the drawing is substantially the lowermost.

It will be understood that the gathering boards 16 are spaced apart similarly to the angles 11 and that the corn stalks pass between these when the machine is moved over the row of corn. The usual gathering chains 33 provided with the fingers 34 are operatively secured to the gathering boards 16 and are driven by means of the shafts 35 and 36 in the usual manner. The snapping rolls 37 are mounted on the inclined portion of the angles 11 and are best shown in Figs. 2, 3 and 4, while their detail construction is shown in Figs. 5 and 6. The upper end of each roll 37 is provided with a shaft 38 journaled in a bearing 39 made integral with the uppermost brace 17. The lower end of each roll 37 is provided with a shaft 40 having its bearing in a block 41 secured to the angle 11. The shaft 40 extends entirely through the bearing block and some distance beyond where it is provided with the sprocket wheel 42, connected by chain 43 to the sprocket 44 secured to one end of shaft 45 which has on its other end the sprocket 46 connected by chain 47 to sprocket 48 secured on the end of shaft 49 which may be made integral with the preferably tapered spirally grooved gathering roll 50. The shafts 45 and 49 also have their bearing in the block 41 and the forward end of the roll 50 has a reduced end having its bearing in the block 51 secured to the extreme front end of the angle 11. As seen in Fig. 3, a roll 50 is provided directly above and forward of each roll 37 and the spiral thread grooves in each roll 50 are arranged at such angle with relation to the speed of rotation of the same that the corn stalks will be fed along rearwardly at the same rate of speed that the machine is being moved forward. The rolls 50 are spaced such distance apart that the space between their enlarged rear ends will permit only one corn stalk to pass therebetween and thus the corn stalks will be arranged in a single row before they are presented to the snapping rolls 37.

At their rear ends the snapping rolls 37 are provided with intermeshing gear wheels 52 to have the said rolls rotate in unison, and one of said rolls 37 has its shaft 38 extended rearwardly and upwardly through bearings 53 and 54 and has secured to its extremity the fly-wheel 55. The bracket which carries the bearing 54 also carries the bearings 56 and 57 to carry the end of shafts 35 and 36 respectively. A chain and pair of sprockets 58 operatively connect the shafts 35 and 36 and a similar chain and pair of sprockets 59 operatively connect the shafts 36 and 38 adjacent the bearing 54. Adjacent the bearing 53 a bevel gear 60 is secured to a shaft 38 which gear meshes with a bevel gear 61 secured on shaft 62 having its front end journalled in bearing block 53 and its rear end journaled in a bearing block 63. The shaft 62 has mounted on its rear end the sprocket wheel 64 connected by the sprocket chain 65 to the sprocket wheel 66 mounted on shaft 67 mounted in suitable bearings 68 rigidly secured to the angle iron frame of the machine. The shaft 67 carries a bevel gear 69 which meshes with the bevel gear 70 secured on the shaft 28 which as above described is driven by the traction wheel 7. Thus it is clear that the snapping rolls 37 and the gathering rolls 50 are rotated by the traction wheel 7 through sprocket wheel 26, chain 27, the sprocket wheel on shaft 28, shaft 28, bevel gear 70, bevel gear 69, shaft 67, sprocket 66, chain 65, sprocket 64, shaft 62, bevel gears 61 and 60, and shaft 38.

When the ears of corn are snapped off the stalks they fall into the inclined trough 71 and thence carried by the traveling fingered chain 72 upward and delivered into the husking compartment 73 where the ears are thoroughly cleaned and separated from all husk particles by properly constructed rolls and air blast mechanism not shown. The chains and sprockets shown at 74 serve to operate part of the cleaning mechanism.

As clearly shown in Figs. 5 and 6, the snapping rolls 37 are made hollow with two one quarter segments 75 diametrically opposite one another mounted on pivots 76 in the ends 77 of the rolls to have one edge of the segment swing out from the normal curvature of the roll. Normally to hold yieldingly the one edge of each segment 75 in its outer position I interpose expanding coiled springs 78 between the free edges of the same and to retain the springs in their proper position I provide the inwardly extending pins 79 on the segments 75. The tension of the spring 78 is sufficiently strong to break or snap the ears of corn from their stalks but not strong enough to crush the corn stalks. I prefer to arrange one roll 37 in a higher plane than the other as shown in Fig. 6, so the ears will more readily fall into the trough 71 which is arranged on one side of the rolls 37.

In Fig. 6, I have illustrated the corn stalk 80 passing between the rolls 37 and an ear of corn 81 just after it has been snapped off. It will be noted by viewing Fig 1, that the corn stalks are free to pass in the slot or space between the rolls 37 in an upright position until the sheet metal plate 14 which rigidly connects the two angle irons 11 together, is encountered when the tops of the stalks will be bent over to pass under said plate 14. It will be understood that the plate 14 is such height above the ground and the gathering rolls 50 are so close to the ground that practically all that portion of the corn stalks which bear ears of corn will come between the two, i. e. below the plate 14 and above the rolls 50.

If the segments 75 were of the same width throughout, and had the receiving ends square, it would sometimes happen that a stalk was brought up to them by the rollers 50 when the free corners of the two sections pressed out by the springs 78 would be substantially in contact and prevent the stalk passing between the rolls. To obviate this difficulty, I cut off each of the forward corners diagonally as shown at 82, which permits its stalks to enter between the rollers 50, irrespective of the position of the segments 75.

In operation the machine is drawn along either by animal or motor power and its course directed to have the gathering boards 16 straddle the row of corn stalks. The gathering chains 33 travel backward at the same rate of speed that the machine travels forward so that the perpendicular position of the corn stalks is not disturbed. The speed of the snapping rolls 37 is also such that the corn stalks are fed rearwardly therebetween at the same rate of speed that the machine travels forward.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new and desire to secure by Letters Patent of the United States is:

1. In a corn picker and husker, snapping rolls provided with yielding sections on their exterior extending the entire length of the roll to contact with the corn passing therebetween.

2. In a corn picker and husker, a pair of snapping rolls each provided with a plurality of yielding sections on its exterior, means for rotating said rolls in unison, and said yielding sections on the one roll arranged to register with the yielding sections on the other roll.

3. In a corn picker and husker, a snapping roll provided with a plurality of yielding sections extending its entire length and forming a part of its exterior surface, each yielding section having its exterior surface curved to correspond to the curvature of the exterior of the roll and pivoted at its edge to have one longitudinal edge swing toward and away from the roll axis, and springs to yieldingly hold the said edge away from the roll axis.

4. In a device of the class described, the combination with a pair of rolls, the fixed peripheries of which are separated a substantial distance, and one of said rolls having a portion of its periphery which tends to extend radially beyond, but which can be compressed toward the normal periphery, gearing between said rolls to cause them to rotate in opposite directions, and means for feeding stalks of corn between said rolls.

5. In a device of the class described, the combination with a pair of rolls, the fixed peripheries of which are separated a substantial distance, and one of said rolls having a portion of its periphery which tends to extend radially beyond, but which can be compressed toward the normal periphery, springs to force said portion outwardly, gearing between said rolls to cause them to rotate in opposite directions, and means for feeding stalks of corn between said rolls.

6. In a device of the class described, the combination with a pair of rolls, the fixed peripheries of which are separated a substantial distance, said rolls each having a portion of its periphery which tends to extend radially beyond, but which can be compressed toward the normal periphery, gearing between said rolls to cause them to rotate in opposite directions, and means for feeding stalks of corn between said rolls.

7. In a device of the class described, the combination with a pair of rolls, the fixed peripheries of which are separated a substantial distance, said rolls each having a portion of its periphery which tends to extend radially beyond, but which can be compressed toward the normal periphery, said movable portions on the two rolls being directly opposed, gearing between said rolls to cause them to rotate in opposite directions, and means for feeding stalks of corn between said rolls.

8. In a device of the class described, the combination with a pair of rolls, one of said rolls having a longitudinal section of its periphery pivotally mounted at one edge, the other edge of said section swinging away from the normal periphery of the roll, of gearing between said rolls to cause them to rotate in opposite directions, and means for feeding stalks of corn between said rolls.

9. In a device of the class described, the combination with a pair of rolls, each of said rolls having a longitudinal section of its periphery pivotally mounted at one edge, the other edge of said section swinging away from the normal periphery of the roll, the edges of said sections being directly opposed, of gearing between said rolls to cause them to rotate in opposite directions, and means for feeding stalks of corn between said rolls.

10. In a device of the class described, the combination with a pair of rolls, each of said rolls having two opposed longitudinal sections of its periphery pivotally mounted at one edge, the other edge of each of said sections swinging away from the normal periphery of the roll, lugs on the inner surfaces of said sections, helically coiled expanding springs secured at their ends upon opposed lugs carried by the two sections, of gearing between said rolls to cause them to rotate in opposite directions, and means for feeding stalks of corn between said rolls.

11. In a device of the class described, the combination with a pair of rolls, the fixed peripheries of which are separated a substantial distance, and one of said rolls having a portion of its periphery which tends to extend radially beyond, but which can be compressed toward the normal periphery, gearing between said rolls to cause them to rotate in opposite directions, means for feeding stalks of corn between said rolls, and means for separating stalks fed thereto.

In witness whereof, I have hereunto set my hand, this 17th day of November, 1923.

CHESTER KNUTSON.